June 26, 1962     B. KATCHEN ET AL     3,041,289

METHOD OF MAKING WALLED CLUSTERS OF CAPSULES

Filed Jan. 2, 1959

- CLUSTER WALL
- CAPSULE WALL
- LIQUID
- SOLID IN LIQUID

- CLUSTER WALL
- CAPSULE WALL
- SOLID
- LIQUID
- SOLID IN LIQUID

- SOLID

- CLUSTER WALL
- CAPSULE WALL
- SOLID
- SOLID IN LIQUID
- LIQUID

INVENTORS
BERNARD KATCHEN
ROBERT E. MILLER

BY

THEIR ATTORNEYS 3,041,289
METHOD OF MAKING WALLED CLUSTERS
OF CAPSULES
Bernard Katchen and Robert E. Miller, Dayton, Ohio, assignors to The National Cash Register Company, Dayton, Ohio, a corporation of Maryland
Filed Jan. 2, 1959, Ser. No. 784,704
2 Claims. (Cl. 252—316)

This invention relates to minute encapsulated clusters of smaller individual capsules, each individual capsule consisting of a core of substantially water-insoluble material surrounded by its own polymer encapsulating shell, and each cluster of such capsules itself, as a whole, being contained in a shell of polymer encapsulating material, and the invention further relates to a method of making such encapsulated clusters. By "minute" is meant capsules that are too small to be handled individually in a manufacturing process.

The core material in each capsule in a cluster, provided by this invention, may be solid, liquid, liquids adsorbed on or in solids, or solid material dispersed in a liquid. The clusters each may include capsules containing the same kind of core material, or may include capsules having different core materials. When the capsules in a cluster contain different kinds of core materials, said materials may be in liquid or solid form, or both. That is to say, the capsules individually may contain either liquid or solid material, or both liquid and solid material, or the capsules collected in a cluster may be of these various kinds, so that a cluster may contain capsules having only liquid material, only solid material, solid material dispersed in a liquid, or mixtures of any of such capsules. It is to be understood that capsules which contain liquid at one temperature may have their contents solidified by cooling if the core material is of that nature; or, if of a heat solidifiable type, solidified by heat, and, conversely, in capsules that originally contained solid core material, the cores may become liquid when raised to a temperature above their melting point.

Thus, if butter-fat were the enclosed core material of a capsule, such would be in a solid state, below approximately 22 degrees centigrade, but would be in a liquid state above such temperature. Or, if a cluster of capsules have heterogeneous core materials, some, or all, of the core materials may be in a liquid or solid state, depending upon the prevailing temperature. In some instances the core material of a capsule may be a liquid having dissolved therein a solid, which solid stays in solution until the temperature surrounding the capsule drops to a point where the dissolved solid becomes insoluble in the liquid and precipitates as a separate phase, to provide a core material which is a liquid having dispersed therein a newly-formed solid material. Likewise, if the core material is a solution of two or more liquids, they may be caused to separate by temperature changes. Such solubility conditions may or may not be reversible depending on the core material characteristics.

The walled-clusters of individual capsules, provided by this invention, make it possible to protect and isolate different materials that should be so isolated before their end use. The materials in the individual capsule cores and the individual capsules themselves are protected against contact with the materials in the cores of adjoining capsules, by the capsule walls, and the materials in the cores of the individual capsules of a cluster are protected against contact with or escape to the surrounding environment outside the cluster shell both by the individual capsule walls and the wall material surrounding each of the cluster of capsules as a whole.

In practice, the core materials of the individual capsules of a cluster are exposed for use by removal of the cluster wall and of the individual capsule walls, which removal may be brought about by physical fracture, chemical solution, chemical reaction, heat, or equivalent effective means.

Provision is made for the encapsulation of discrete entities of core materials by use of an aqueous liquid medium containing dissolved therein capsule wall-forming materials and materials which form around each cluster of capsules. The clusters of capsules so-made are completed in the aqueous medium and may be used as a liquid dispersion in said medium, or the residual aqueous medium, together with any undeposited wall-forming material, may be removed, in part or altogether, by filtering, decanting, centrifuging, evaporation, or other commonly used separation means, to obtain the clusters as a concentrated liquid dispersion thereof, or as dry particles, each of which particles may consist of one or more of the walled clusters. Among the materials which may be core entities in the individual capsules, are natural, mineral, animal, and vegetable oils, and fractions or mixtures thereof. Specific examples of mineral oils, are petroleum and its fractions, such as lubricating oil, kerosene, gasoline, naphtha, and paraffin oil. Among the animal-derived oils may be mentioned sperm oil, cod-liver oil, other fish oils, melted butter-fat, lard-oil, and neat's-foot oil. Vegetable and fruit oils, which are adapted for encapsulation, among many, include lemon oil, peanut (ground-nut) oil, linseed oil, soy-bean oil, castor oil, corn oil, and tung oil. Also considered as vegetable oils are some common water-immiscible liquids, such as turpentine and tall oil. Among synthetic liquids, classed as oils, may be mentioned methyl-salicylate, benzene, toluol, vitamin-A-palmitate, chlorinated diphenyl, benzyl-benzoate, styrene monomer, melted hydrogenated oils, and other modified natural water-immiscible liquid materials.

Among the many pharmaceutical solids which are available for encapsulation are riboflavin, salicylamide, tetracycline hydrochloride, tetracycline phosphate, phenaglycodol, chlorotrianisene, cholesterol, meprobamate, erythromycin propionate, benzathene penicillin G, and vitamin K.

Not expressly specified, but eminently subject to encapsulation, are many flavor, aroma, and perfume substances, which are solids, or are contained in solution in solids; or liquids, such as cocoa butter, coffee oil, peppermint oil, spearmint oil, musk, citronella-oil, and palm-oil.

The whole field of available substances that can be encapsulated, by the method specified herein, is so vast that the particular substances noted above as core material possibilities, may be considered merely as a variety of examples. Walled clusters of capsules containing core materials may be used for administering drugs and foods which must be protected either from shelf-life environments, or from deleterious actions of living organisms met with before the drugs or foods have come to the place where they are intended for use. The capsules and clusters of capsules made by the specified method may contain volatile or oxidizable core materials which are protected against such action by being enclosed in the capsule wall materials and in the cluster wall materials. Among such volatile and/or oxidizable core materials which may be so protected against such deleterious action by being enclosed in the capsule walls are insecticides, which are, or are carried in, an evaporable liquid. The liquids before mentioned, kerosene, naptha, gasoline, and similar substances come within this volatile category. Other substances required to be kept from oxidizing, among those already named, are vitamin A palmitate, coffee oil, cod-liver oil, linseed oil, milk-fat and some of the flavoring liquids.

The capsule wall materials are useful in slowing up the release of the core materials, of a medicinal or food nature, when deposited in a living animal, as will be specified, by example, later on. The encapsulating wall materials are those that can be deposited out of an aqueous solution of such material onto core entities and onto clusters of previously encapsulated core entities.

It is contemplated, also, to encapsulate chemical materials which are reactant on contact, so as to keep such apart until the physical barrier comprising the individual capsule encapsulating materials, and the cluster encapsulating materials have been broken. For instance, some capsules in a cluster may contain, as core material, an oil solution of a colorless color reactant material, which reactant material, on contact with the core materials of other capsules in the cluster produce, by chemical reaction, a distinctive color. On the other hand, the capsules of a cluster may have a particular kind of core material, which is reactive with the core material of capsules of another cluster of capsules. Thus, there may be a mixture of different kinds of core materials in capsules in a single cluster, and/or mixtures of different kinds of clusters, with the capsule core material of the capsules of one cluster different from those of another cluster.

The process of making the walled clusters of minute capsules, in one instance, requires the formation of an oil-in-water emulsion in which the dispersed phase units each become the nucleus of a capsule and the continuous phase is an aqueous solution or sol of wall-forming colloid materials. These wall-forming materials are caused to separate out as complex colloid-rich phases, in steps, by the phenomenon of coacervation induced by changing the conditions of the emulsion, the colloid-rich phase which first separates out depositing on the individual nuclei as seed points to form rudimentary minute capsules with colloid-rich liquid walls. The second phase separation deposits as complex colloid-rich liquid walls about clusters of the capsules. The colloid material finally is gelled to form capsules and clusters of capsules with solid walls. The phenomenon of coacervation by which such phase separation occurs is disclosed in U.S. Patent 2,800,457, which issued July 23, 1957, on the application of Barrett K. Green and Lowell Schleicher, and in U.S. Patent 2,800,458 which issued on the same day on an application of Barrett K. Green.

The material which forms the walls of the individual capsules and the encapsulating walls of the clusters of capsules should be of a wall-forming nature, and soluble in water or other aqueous medium, which aqueous solution constitutes the medium in which the encapsulation of the core materials and the formation of encapsulated clusters of the capsules take place.

With respect to the characteristics of materials which may be used as core entities in the aqueous medium in which the capsules are formed, it is to be noted that not only water-insoluble materials may be used, but there also can be used materials which are slightly soluble in water, such material first forming a saturated solution with the aqueous medium, after which the remainder of the material remains undissolved and being dispersed in the aqueous medium may constitute core entities around which capsule walls form. Further, water-soluble materials may be dissolved in other materials, the so-formed solution being water-insoluble and thus dispersible as discrete entities in an aqueous medium, so as to form core entities onto which encapsulating wall material can be deposited out of said aqueous medium. The intended core material may be dissolved in another material, and the so-formed solution may be further dissolved or carried in a third medium, which third medium and dissolved substances is dispersible as discrete entities in the aqueous medium and thus form seed-points around which the capsular material may be deposited. The criterion involved here in the dispersion of the core material entities is that they can exist as separate entities whether alone, or carried by another substance, in the aqueous medium in which the wall-forming material is dissolved, without interfering with the coacervate deposit of wall material around such entities as seed points. In those cases where the core material is partially water-soluble and the undissolved particles of core material are encapsulated in a saturated aqueous solution of it, the capsules so formed and the clusters of such capsules so formed, when redispersed in an unsaturated aqueous medium, such as pure water, may lose part of the core contents by diffusion and solution phenomena. Wherever, in this specification and the claims, the term "water-insoluble material" or "core entities" is used, there are included core materials which are made water-insoluble by being dissolved in a water insoluble material.

The encapsulating materials, besides being of film-forming nature, should have the property which permits them to act as a barrier for the core materials to be used, and permits of the capsular material being exposed by removal of the encapsulating wall material, by one or more of the treatments of fracture, chemical dissolution or solution, heat, or equivalent means, or combinations thereof. The walled capsules and walled clusters may purposely be made micro-porous in a degree, by special drying techniques, to allow escape of the core materials by liquid leakage or evaporation. Such special micro-porosity can be controlled by adjusting the porosity, as will be explained.

Inasmuch as the walled-clusters of capsules, which are the subject matter of this invention, may be used as medicines or dietary supplements, for living organisms, the encapsulating material for such use should be soluble in various animal body fluids, and non-toxic, unless such is part of the medical or nutrient treatment. If the clusters of capsules are to be used other than by solution, the solubility characteristics just mentioned need not be observed.

Encapsulating wall-forming material, which meets all general requirements, can be chosen from the natural film-forming materials, such as gelatin, gum-arabic, Chondrus, zein and soy bean protein, which substances are ordinarily solid at room temperature (about 20 degrees centigrade), but other film-forming material, such as polyvinylmethylethermaleic anhydride copolymer, polyethyleneimine, polyethylenemaleic anhydride copolymer, and polymerizable water soluble equivalents may be used. The wall-forming encapsulating materials chosen may be used in various desired combinations which will become evident in the descriptions to follow.

The invention will be described in the examples to follow, in connection with the drawings, of which FIGS. 1 to 6 inclusive are diagrammatic representations of sections through walled clusters of capsules, greatly magnified, having various capsular components. The drawings show each capsule as sectioned in a mid-plane, although in actuality a section through a walled cluster of capsules would show some in elevation in the background and others sectioned at various planes. Of the drawings.

Figure 1:
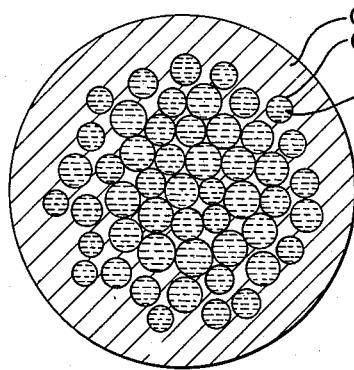
FIG. 1 is a section through a walled cluster of capsules in which the core material is liquid.

The encapsulation of castor oil in walled clusters of individual capsules, for use as a medicine which may be taken orally, without contact of the castor oil with the mouth and throat surfaces of the user, will be taken as a preferred example of the invention.

*Example I*

A potentially coacervatable mixture is made, under conditions of continuous agitation, and an adjusted pH to at least 9, for this example, so that complex coacervation is not possible, by emulsifying 50 grams of castor oil in an aqueous solution of 55.5 grams of pigskin gelatin, having its iso-electric point at about pH 9, and 500 milliliters of water at 45 degrees centigrade, and this emulsion is mixed with a solution of 55.5 grams of gum-arabic and 500 milliliters of water, keeping the mixture at a temperature above the gel point of the gelating. This mixture is diluted with 4000 grams of water heated to 45 degrees centigrade. The water-diluted mixture has added thereto 32 grams of a 5%, by weight, aqueous solution of polyvinylmethylethermaleic anhydride copolymer. This coacervatable mixture, still at or above pH 9 and at about 45 degrees centigrade, has added thereto a 20%, by weight, aqueous solution of acetic acid, drop-by-drop, with continued agitation, until a pH of 6 is reached. The oil droplets individually now have had deposited thereon a liquid capsular wall, consisting of some of the gelatin, gum-arabic, and polyvinylmethylethermaleic anhydride copolymer, in a dense state, said deposit of material around the oil droplets having been caused by coacervate forces. At this point the dense-liquid walled rudimentary capsules having oil cores, have clustered into small units with no wall around the individual clusters as a body. Now, after the capsules have formed such clusters, the materials being kept at 45 degrees centigrade, and still being agitated, the pH is reduced to 4.2 with a 20%, by weight, aqueous solution of acetic acid, to cause co-acervate deposition of the fractions of the polymeric material which did not deposit around the capsules at pH 6. The last deposition of polymeric material occurs as a dense-liquid wall around the cluster units, individually, to form encapsulated cluster units. The walled cluster units, kept as individual entities, by agitation, are next treated to solidify the polymeric material, both the capsule walls individually and the outer cluster walls. Both the capsule walls and the cluster walls contain gelatin as a dense liquid polymer complex, either with the polyvinylmethylethermaleic anhydride copolymer, the gum-arabic, or both. The clusters may be cooled to gel the deposited wall materials. The walled clusters of capsules can now be treated as solids dispersed in a residual aqueous medium or they may be dried and treated as solid minute units, such drying being accomplished in any manner desired, to remove the water, as by decanting, filtration, centrifuging, or subjecting them to hot or cold drying environments. Further treatment may be given to the gelatin components to insolubilize them and raise the melting point thereof, and consequently of the total polymer complex, by subjecting such clusters to an aqueous solution of formaldehyde, or equivalent, which conveniently may be introduced into the dispersion of walled clusters in the residual aqueous medium while still warm. For the given amounts of material, 10 milliliters of a 38% by weight, aqueous solution of formaldehyde is introduced into and stirred with the dispersion of capsule clusters. After the clusters are gelled by cooling, the pH is raised to 9.5–10.0 to accelerate the formaldehyde action on the gelatin. In some instances, the raising of the pH of the residual aqueous medium to harden the walled clusters tends to cause more or less agglomeration of the walled clusters at the initiation of the hardening process. To avert this agglomeration there is introduced into the dispersion of walled aggregates, before the pH is raised to 9.5–10.0, and while the mixture is still cool, 50 milliliters of a 5%, by weight, aqueous solution of polyvinylethylethermaleic anhydride copolymer adjusted to pH 5, which copolymer will combine with the uncoacervated gelatin to render it ineffective as an agglomerating agent. The clusters of walled capsules, so produced, are then ready for use as desired. Another method for hardening the clusters of walled capsules without the use of formaldehyde, is to introduce into the aqueous dispersion of walled clusters, cooled to 15–20 degrees centigrade, 20 milliliters of a 25%, by weight, aqueous solution of glutaraldehyde with agitation for several hours, after which the temperature may be permitted to rise to room temperature (about 22 degrees centigrade or more) over a period of 12 hours with continued agitation. This latter method of hardening eliminates the raising of the pH to 9.5–10.0 and, thereby, eliminates the necessity of adding more polyvinylmethylethermaleic anhydride copolymer to the residual aqueous medium. A substitute for the polyvinylmethylethermaleic anhydride copolymer is polyethylenemaleic anhydride copolymer used in the same amounts and under similar conditions. If it is desirable to eliminate from the clusters, and their environment, any left-over materials used in the formation thereof, such may be done by filtering and washing processes common in the art. Thus, the dispersion of finished clusters may be repeatedly filtered and washed with water. The so-cleaned clusters may be re-dispersed in any liquid in which it is desired to use them, or they may be dried to free-flowing clusters, which are like powdered material, as far as the unaided eye can see, although containing a large percentage of liquid, if such is the core contents. These clusters of liquid-containing capsules cannot be reproduced exactly in a drawing. A diagrammatic showing of enlarged examples of single clusters of walled liquid containing capsules, with appropriate designation of the structural elements thereof, has been offered. It is an idealistic showing. Probably, in actuality, the clusters are not perfect spheres, nor are the contained capsules perfect spheres, as forces pushing them together would tend to distort them. The capsules in a cluster probably are packed as close as space will permit with the polymeric material of the cluster walls penetrating into the interstitial spaces between the capsules of a cluster, as shown in the various figures of the drawing. The capsules are not drawn to scale with respect to the cluster size, as the capsules vary considerably in size.

*Example II*

Figure 2:
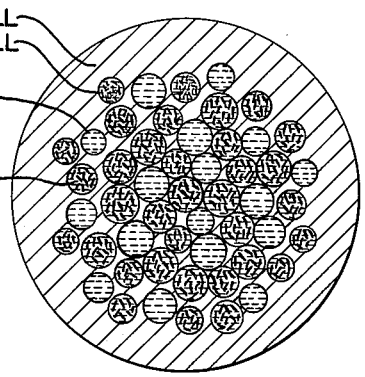
FIG. 2 is a section through a walled cluster of capsules, in which the core material in some capsules is liquid and in others liquid with solid material dispersed therein.

As an example of aggregates having capsules of different kinds, as shown in FIG. 2, some of the capsules containing only liquid and some of the capsules containing liquid having solid material carried therein, cottonseed oil will be used as a substantially water-insoluble material and chlorotris(p-methoxyphenyl)ethylene will be used as a material solid at room temperature, the latter being a synthetic sex hormone. Two emulsions are made, a first emulsion being made as in Example I, but substituting cottonseed oil for the castor oil. The second emulsion is made as in Example I, but chlorotris(p-methoxyphenyl)ethylene is added, as a finally divided material, to the cottonseed oil, before emulsification. The solid material may be dissolved in the cottonseed oil at a high temperature and allowed to precipitate out as a fine dispersion, by cooling in the final cooling step. The second emulsion may be made with the oil phase, which contains a solid material, in the amount desired. The first and second emulsions then are mixed and the coacervation and clustering steps carried out, as in Example I, the clusters so-formed containing two types of capsules, one type containing the cottonseed oil and the other the solid material dissolved in the cottonseed oil. The gelling and hardening procedure is like in Example I, if it is desired or necessary to so treat the clusters. The mixed capsular aggregates of Example II are represented by FIG. 2, the rod-shaped elements as shown in the capsules representing solid material of whatever shape or orientation. The remarks made in connection with the discussion of the elements of FIG. 1, as regards the proportions and representations thereof, apply equally as well to FIG. 2.

*Example III*

Figure 3:
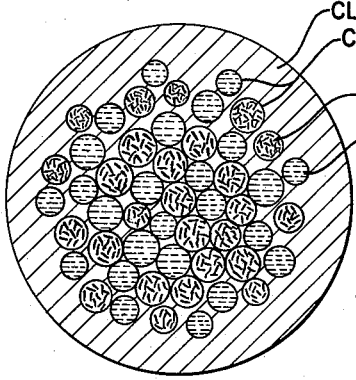
FIG. 3 is a section through a walled cluster of capsules, in which some of the capsules have liquid core material and other capsules have solid core material.

The clusters, which are the result of the process of Example III, are shown in FIG. 3, which indicates two kinds of capsules, one kind of capsule having a liquid core material only and the other type of capsule having solid core material only. The liquid core material selected, as an example, again is cottonseed oil, and the solid core material selected, as an example, is riboflavin. Into a solution of 27.75 grams of, the before specified, gelatin in 450 ml. of water, at 45 degrees centigrade, adjusted to pH 9, is emulsified 12.5 grams of cottonseed oil. A separate solution is made of 55.5 grams of gum-arabic in 500 milliliters of water, at 45 degrees centigrade, with the pH adjusted to 9, if necessary to prevent premature coacervation, and mixed into the emulsion. To this mixture is added 32 grams of a 5%, by weight, aqueous solution of polyvinylmethylethermaleic anhydride copolymer. To the foregoing total mixture is added 3900 grams of water. At this point the pH of the water-diluted mixture is lowered to 6.5 and 12.5 grams of ribonflavin dispersed in a solution of 27.75 grams of gelatin, and 150 grams of water at pH 6.5 is added. With continuous agitation the pH is lowered to 3.5 by addition of a 20%, by weight, aqueous solution of acetic acid drop-by-drop. At this point the deposition of the polymer material has been completed and the aggregates are then solidified, by chilling, with continuous agitation, at a temperature adequate to gel the wall materials. When the clusters are thus chilled and the walls thereof solidified, there is added 50 milliliters of a 25%, by weight, aqueous solution of glutaraldehyde, which is thoroughly incorporated by continued agitation at the lowered temperature for several hours. The temperature is allowed to rise to room temperature (22 degrees centigrade) over a period of 12 hours. The walled-clusters now are completed and may be washed and handled as in the previous example.

In the diagrammatic showing, in FIG. 3, of one of these clusters, the liquid-containing capsules are like those shown in FIG. 1, whereas the solid-containing capsules show much solid material as a plurality of rods, although in actuality, the particles may be of any shape, and each particle may occupy the whole core space of a capsule, whether it is spherical or not, the walls of such capsule being distorted accordingly. Otherwise, the remarks made concerning the diagrammatic showing of FIGS. 1 and 2 apply to this FIG. 3.

*Example IV*

Figure 4:
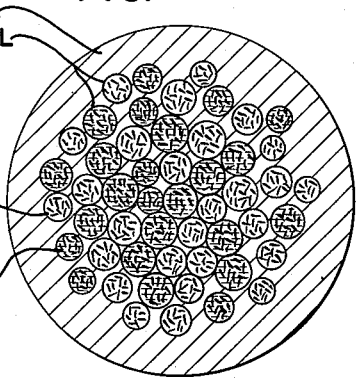
FIG. 4 is a section through a walled cluster of capsules, in which some of the capsules contain solid core material and others of the capsules contain as core material liquids having solid material dispersed therein.

In this example there will be discussed clusters having two kinds of capsules, one kind of capsule containing solid core material and the other kind of capsule containing solid material dispersed in a liquid, as core material, as shown in FIG. 4.

The liquid core material chosen for Example IV is corn (maize) oil, and the solid material is 2-p-chlorophenyl-3-methyl-2,3-butanediol, which conveniently may be called phenaglycodol. Into a solution of 50 grams of the specified gelatin in 450 milliliters of water, at 45 degrees Centigrade, adjusted to pH 9, is emulsified a slurry of 6.25 grams of corn oil and 6.25 grams of phenaglycodol. A separate solution is made of 55.5 grams of gum-arabic and 500 milliliters of water at 45 degrees centigrade, with its pH adjusted to 9, and mixed into the emulsion. To this mixture is added 32 grams of a 5%, by weight, aqueous solution of polyvinylmethylethermaleic anhydride copolymer. To this total mixture is added 3900 grams of water at 45 degrees centigrade. At this point the pH of the mixture is lowered to 6.5 and 12.5 grams of phenaglycodol is dispersed in a solution of 5.5 grams of gelatin in 150 grams of water at pH 6.5 is added. With continuous agitation the pH is lowered to 4 by addition of a 20%, by weight, aqueous solution of acetic acid, drop-by-drop. At this point the deposition of the polymer material has been completed and the clusters are then solidified, by chilling, with continuous agitation.

Further treatment may be given the gelatin to insolubilize it and raise its melting point by subjecting it to an aqueous solution of formaldehyde or other hardening agent as set forth in Example I.

Clusters so formed may be filtered, washed, and dried, if desired, to fulfill the requirements of intended use.

*Example V*

Figure 5:
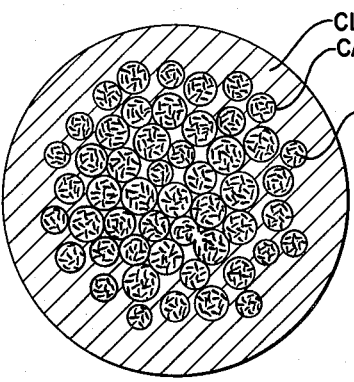
FIG. 5 is a section through a walled cluster of capsules in which the core material is solid.

In this example there will be discussed the production of clusters of capsules each of the capsules containing solid material, as represented in FIG. 5. As before said, the showing of the solid material as short rod-like entities is an extremely diagrammatic showing. In the first place, the solid particles need not be of the same size but they must be quite small, say of the order of 20 microns, although larger particles may be encapsulated. They may be of any shape, and they may consist of more than one material, that is to say, a mixture of particulate solid materials. Such solid material particles probably are encased individually in capsule walls and the capsule will, therefore, take the shape of the encased particle, be it round, acicular, angular, or irregular in contour. The same is true in the encapsulated solids in aggregates of FIGS. 3, 4 and 6, if they are not changed by being dispersed in a fluid.

Among representative solid materials, which may be encapsulated as microscopic particles, may be mentioned bentonite, titanium dioxide, and the phenaglycodol mentioned in Example IV, as representative of pharmaceutical materials, and in addition, other materials such as magnetic iron oxide, calcium carbonate, zinc sulphide, carbon black, powdered solid polymer materials, solid catalysts, and other obviously equivalent materials which are substantially insoluble in an aqueous medium within the pH ranges met with in the following procedure in which magnetic iron oxide will be used as a specific example.

A potentially coacervatable mixture is made, under conditions of continuous agitation and a pH adjusted to prevent spontaneous coacervation, by dispersing 25 grams of finely divided magnetic iron oxide in an aqueous solution of 55.5 grams of the specified pigskin gelatin in 500 milliliters of water at 45 degrees centigrade. This dispersion is mixed with a solution of 55.5 grams of gum-arabic and 500 milliliters of water, keeping the mixture at a temperature above the gel point of the gelatin. From the formation of this mixture, the procedure is the same as in Example I, the difference in this example being that the core material is a solid instead of a liquid. At the conclusion of the procedure pointed out in this process, the microscopic walled clusters will include capsules having polymer walls and magnetic iron oxide particles as cores. As said, any other water insoluble solid materials or mixtures of them may be used. For instance, half of the amount of iron oxide used in this example may be exchanged for bentonite, and the capsules in the aggregate will contain both the core materials.

Example VI

Figure 6:
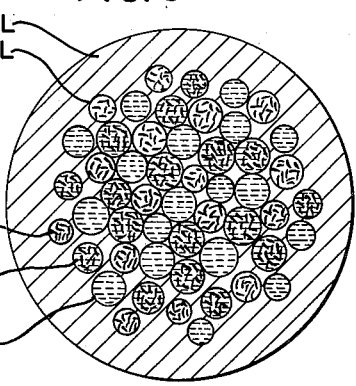
FIG. 6 is a section through a walled cluster of capsules in which some of the capsules have liquid core material, some have solid core material, and some have liquid core material with solid material dispersed therein.

In this example, a procedure for making clusters of capsules corresponding to FIG. 6 will be disclosed. In FIG. 6 a cluster may contain capsules of three kinds: (a) those containing only liquid, (b) those containing solid material dispersed in a liquid, and (c) those containing only solid material.

As a specific example, the oil used is corn oil, and the solid used is a mixture of the two solids, riboflavin and phenaglycodol.

Inasmuch as three kinds of core inclusions are contemplated, three mixtures or dispersions will have to be made, the core materials being included therein as the dispersed phase. First, 8.5 grams of corn oil is emulsified in an equeous solution of 25 grams of pigskin gelatin and 225 milliliters of water, at 45 degrees centigrade, adjusted to pH 9. This is set aside. Second, four grams of phenaglycodol is dispersed in 8.5 grams of corn oil, and the dispersion is emulsified in a solution of 25 grams of pigskin gelatin and 225 millimeters of water, at 45 degrees centigrade, adjusted to pH 9. Third, mix the oil emulsion and the dispersion of solid-in-oil and water, together, and keep the mixture continuously agitated. To this mixture is added 55.5 grams of gum-arabic dissolved in 500 milliliters of water having a temperature of 45 degrees centigrade and adjusted to pH 9.

Dilute the resulting mixture, with continuous agitation, with 3900 millimeters of water at 45 degrees centigrade, and adjusted pH 9. At this point 32 grams of a 5%, by weight, aqueous solution of polyvinylmethylether-maleic anhydride copolymer is added to form a potentially coacervatable mixture. The pH of this coacervatable mixture is now lowered to pH 6.5, with continued agitation, by the use of a 20%, by weight, aqueous solution of acetic acid, added drop-by-drop.

At this point small clusters of capsules form the walls of which are still in a liquid state, some of the capsules containing the corn oil and some of the capsules containing the phenaglycodol dispersed in corn oil.

Fourth, four grams of riboflavin dispersed in a solution of 5.5 grams of pigskin gelatin and 150 milliliters of water at 45 degrees centigrade, and having a pH of 6.5, is mixed into the dispersed clusters of the two kinds of liquid-walled capsules. The pH then is further reduced by a drop-by-drop addition of the same strength acetic acid solution, with continued agitation, to 3.8, during which pH reduction, further liquid-walled capsules containing riboflavin are formed and join the clusters. After these riboflavin-containing capsules are formed, the remaining polymer material deposits around each cluster of capsules to form a walled cluster of such capsules, each wall of a cluster being liquid. The liquid-walled clusters then are cooled to solidify the walls, and 25 milliliters of a 25%, by weight, aqueous solution of glutaraldehyde is mixed therewith, and agitation is continued for several hours. The temperature then is allowed to rise to room temperature (22 degrees centigrade) over a period of 12 hours. The clusters are now completed and may be washed and handled as in previous examples. The same comments made concerning the shape of the capsules containing solid core materials as were made concerning the previous examples, apply here.

From the foregoing procedural examples, it will be evident that in all cases the deposition of the capsule wall material occurs in one pH range, and the deposition of the wall material surrounding the clusters of capsules occurs at a lower, that is, more acid pH range. These pH ranges are reached consecutively in point of time and in a continuous lowering of the pH range. The composition of the wall material depends on the fractions of the various kinds of polymer material which become insoluble at a given pH value.

Although in the described embodiment of the invention successive stages of polymer deposit have been brought about by controlling the pH of the aqueous external phase of the emulsion, the invention includes the bringing about of the solubility conditions which control such successive deposits by other means known in the art of coacervation.

While the foregoing examples show the kinds of different capsules that can be contained in a single-walled cluster, it will be apparent that the invention provides means for making clusters of different kinds by making clusters of one kind in one set of procedural steps and making clusters of another kind in another set of procedural steps, and when the clusters are finished and gelled or hardened mixing the kinds of clusters together, so that any combinations of the types shown in FIGS. 1 to 6 may be interspersed together either in a liquid vehicle or as solid particulate powdered clusters, to achieve the desired effect.

The invention provides means for making very strong clusters of capsules in which the core materials are physically and chemically protected to a substantial degree and in which the individual capsules of different kinds are isolated from contact with one another with respect to the core contents thereof.

What is claimed is:

1. A process for making minute liquid-walled clusters of individually-liquid-walled capsules, each capsule containing substantially water-insoluble core material to be protected by such walls, including the steps of
    (a) preparing an aqueous solution of three film-forming hydrophylic polymer materials, said polymer materials having fractions which become consecutively insoluble in stages as the pH of the system is lowered, by complex combinations with other polymer fractions thereof, to form gelable and solidifiable complex units, and said solution having dispersed therein minute discrete entities of intended core material, the insoluble material being maintained dispersed in said aqueous solution-dispersion throughout the process;
    (b) lowering the pH of said solution-dispersion to a degree to cause formation of liquid complexes of a portion of the polymer material fractions, such complexes depositing around each of the core entities individually as liquid walls, and keeping such walled entities agitated in the remaining aqueous solution until clusters of such liquid-walled entities form to the desired size; and
    (c) thereafter lowering the pH further to insolubilize, by complex combination, remaining fractions of the polymer material, which water-insoluble complexes of remaining fractions deposit around the clusters to form liquid-walled clusters.

2. A process for making minute solid-walled clusters of individually-walled capsules, each capsule containing water-insoluble core material to be protected by such walls, including the steps of
    (a) preparing an aqueous solution of three film-forming hydrophilic polymer materials, said polymer materials having fractions which become consecutively insoluble in stages as the pH of the system is lowered, by complex combinations thereof with other polymer fractions, to form solidifiable liquid complex units, and said solution having dispersed therein minute discrete entities of intended core material, the insoluble material being maintained dispersed in said aqueous solution-dispersion throughout the process;
    (b) lowering the pH of said solution-dispersion to a degree to cause formation of liquid complexes of a portion of the polymer material fractions, such complexes depositing around each of the core entities individually as liquid walls, and keeping such walled entities agitated in the remaining liquid solution until clusters of such liquid-walled entities form to the desired size;

(c) thereafter lowering the pH further to insolubilize, by complex combination, remaining fractions of the polymer material, which water-insoluble complexes of remaining fractions deposit around the clusters to form liquid-walled capsule clusters; and (d) gelling the walls deposited around the capsules an the clusters thereof.

References Cited in the file of this patent
UNITED STATES PATENTS

| | | |
|---|---|---|
| 2,314,527 | Taylor | Mar. 23, 194 |
| 2,800,457 | Green et al. | July 23, 195 |

UNITED STATES PATENT OFFICE
CERTIFICATE OF CORRECTION

Patent No. 3,041,289                          June 26, 1962

Bernard Katchen et al.

It is hereby certified that error appears in the above numbered patent requiring correction and that the said Letters Patent should read as corrected below.

Column 3, line 30, after "of" insert -- three --; column 5, line 22, for "gelating" read -- gelatin --; column 7, line 36, for "ribonflavin" read -- riboflavin --; line 56, for "much" read -- such --; column 9, line 31, for "millimeters" read -- milliliters --; line 36, for "is now" read -- now is --

Signed and sealed this 30th day of October 1962.

(SEAL)
Attest:

ERNEST W. SWIDER
Attesting Officer

DAVID L. LADD
Commissioner of Patents